No. 761,028. PATENTED MAY 24, 1904.
G. L. BOURQUIN & R. LOEB.
EMBROIDERING MACHINE.
APPLICATION FILED AUG. 6, 1898.
NO MODEL. 5 SHEETS—SHEET 2.
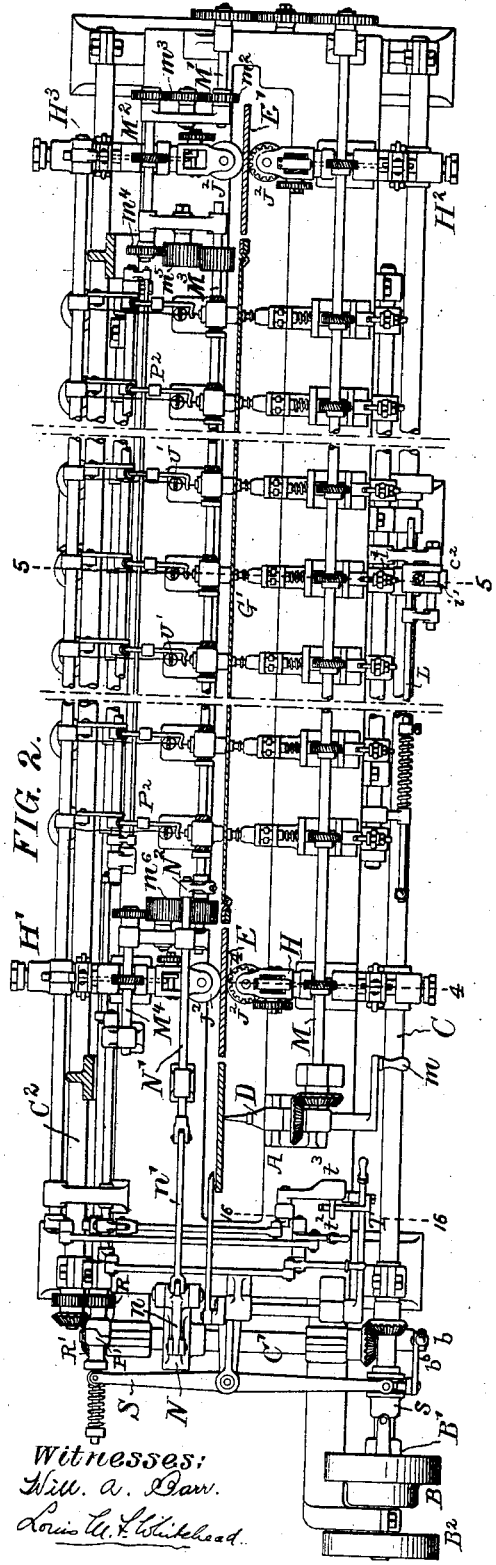
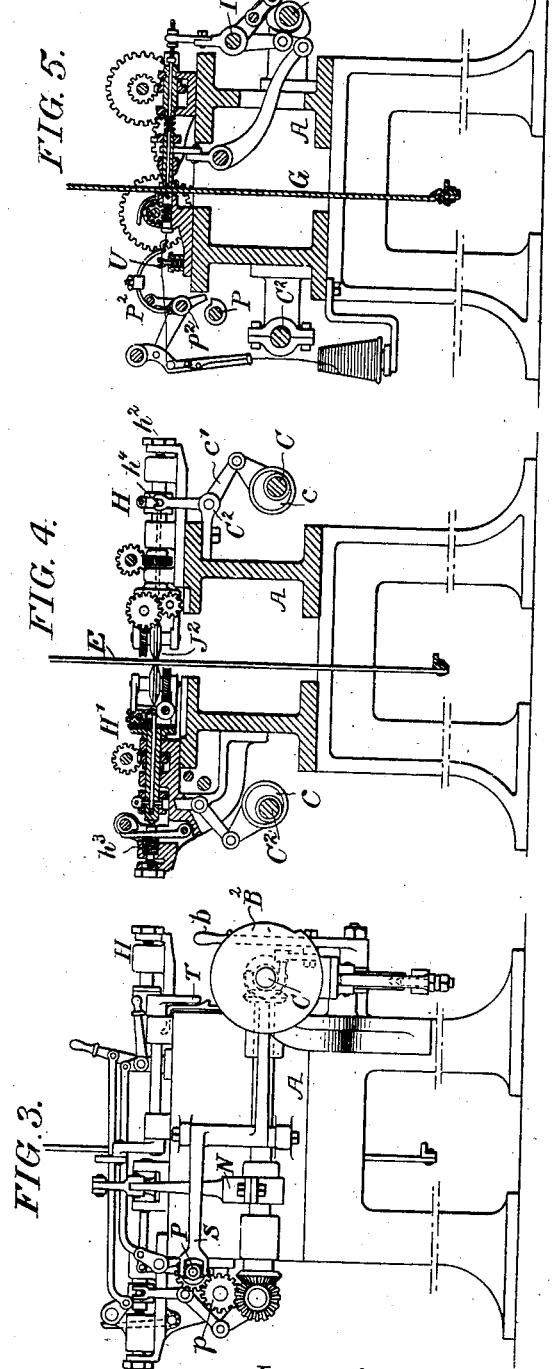
Witnesses:
Will. A. Barr.
Louis M. F. Whitehead.
Inventors:
Gustave Louis Bourquin
and Rudolf Loeb
by their Attorneys
Hinman & Hinman
THE NORRIS PETERS CO., PHOTO-LITHO., WASHINGTON, D. C.

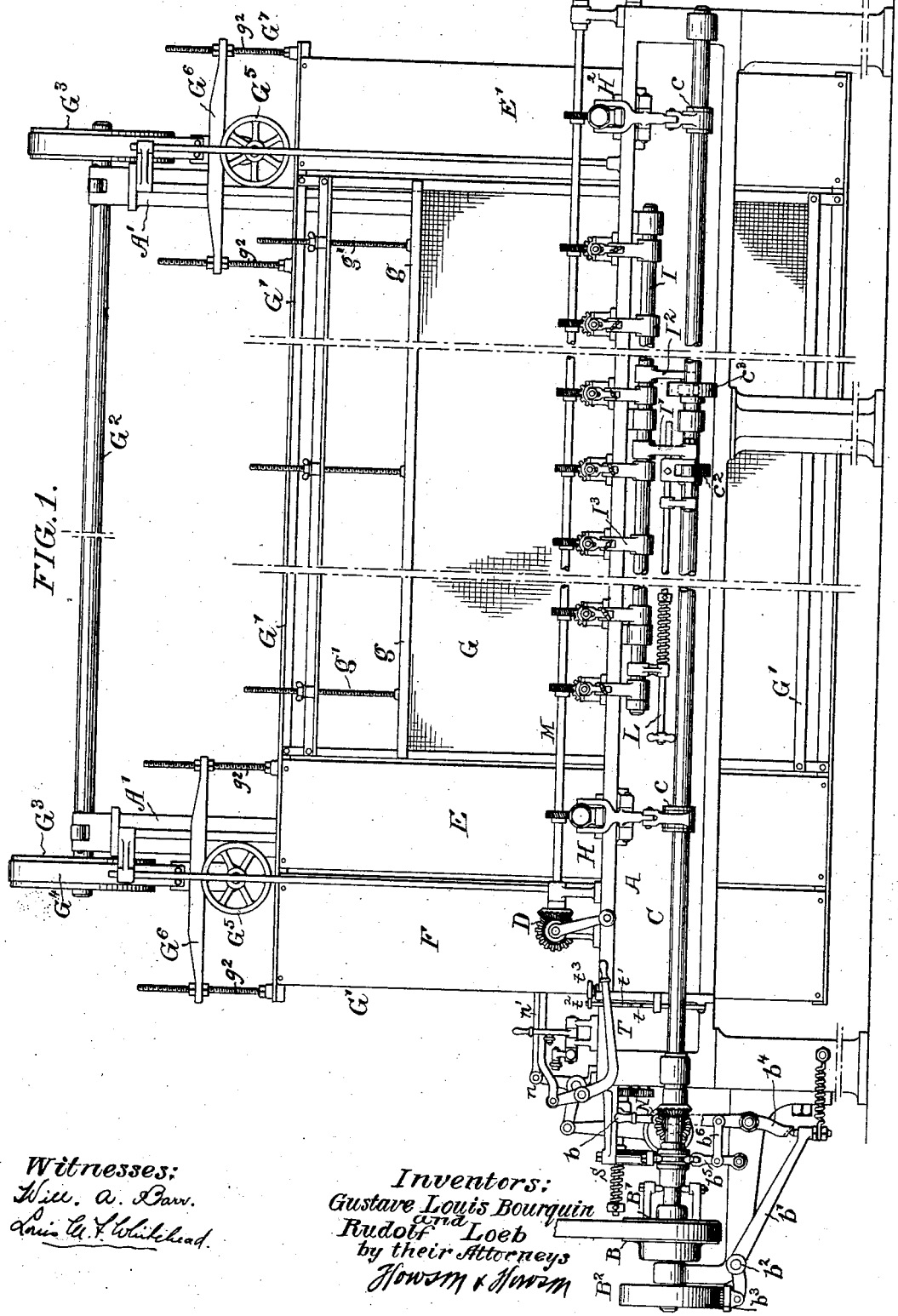

No. 761,028. PATENTED MAY 24, 1904.
G. L. BOURQUIN & R. LOEB.
EMBROIDERING MACHINE.
APPLICATION FILED AUG. 6, 1898.
NO MODEL. 5 SHEETS—SHEET 3.
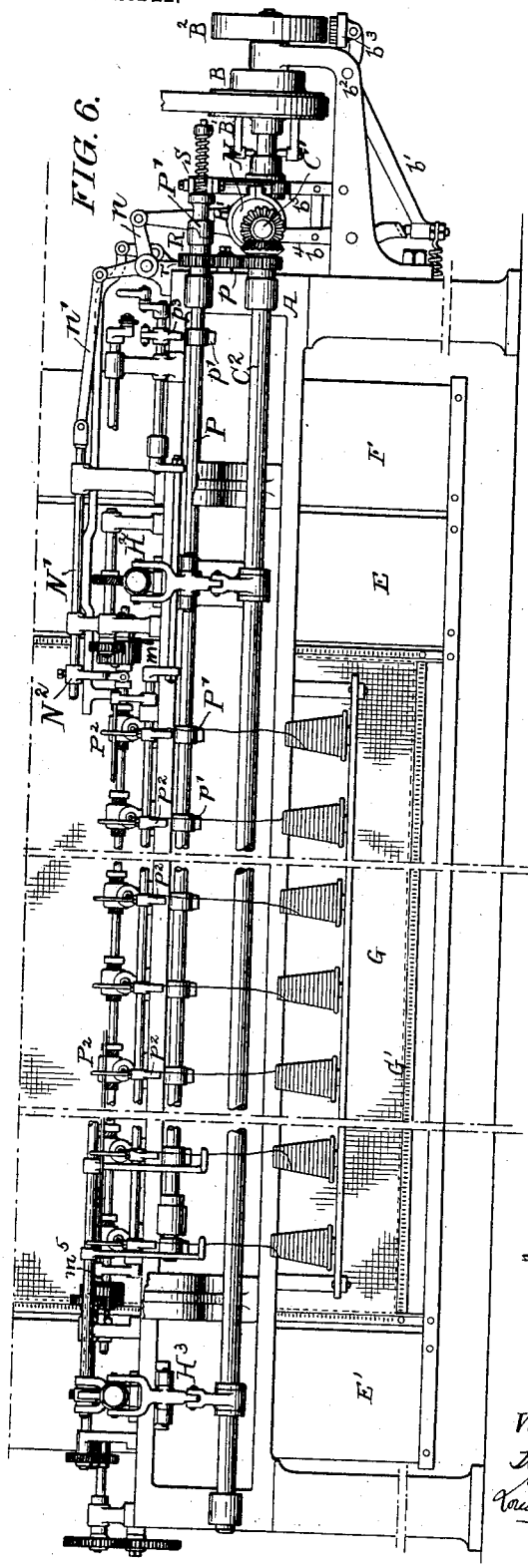
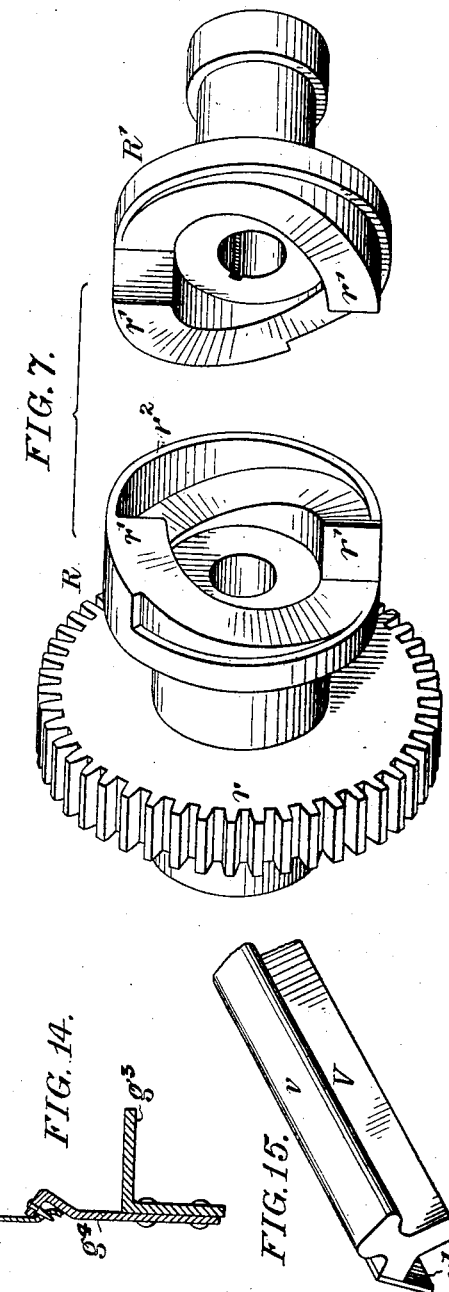
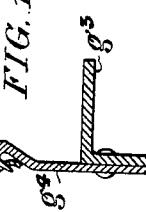
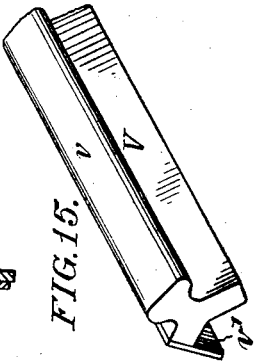
Witnesses:
Will. A. Barr.
Louis M. T. Whitehead.
Inventors:
Gustave Louis Bourquin
and
Rudolf Loeb
by their Attorneys
Howson & Howson No. 761,028. PATENTED MAY 24, 1904.
G. L. BOURQUIN & R. LOEB.
EMBROIDERING MACHINE.
APPLICATION FILED AUG. 6, 1898.
NO MODEL. 5 SHEETS—SHEET 4.

Witnesses:
Will. A. Barr.
Louis A. F. Whitehead.

Inventors:
Gustave Louis Bourquin
and
Rudolf Loeb
by their Attorneys
Howson & Howson No. 761,028. PATENTED MAY 24, 1904.
G. L. BOURQUIN & R. LOEB.
EMBROIDERING MACHINE.
APPLICATION FILED AUG. 6, 1898.
NO MODEL. 5 SHEETS—SHEET 5.

Witnesses:

Inventors:
Gustave Louis Bourquin
and Rudolf Loeb
by their Attorneys

No. 761,028. Patented May 24, 1904.

UNITED STATES PATENT OFFICE.

GUSTAVE LOUIS BOURQUIN, OF MERCHANTVILLE, AND RUDOLF LOEB, OF CAMDEN, NEW JERSEY, ASSIGNORS, BY MESNE ASSIGNMENTS, TO LOEB AND SCHOENFELD COMPANY, OF CAMDEN, NEW JERSEY, A CORPORATION OF NEW JERSEY.

EMBROIDERING-MACHINE.

SPECIFICATION forming part of Letters Patent No. 761,028, dated May 24, 1904.

Application filed August 6, 1898. Serial No. 687,946. (No model.)

*To all whom it may concern:*

Be it known that we, GUSTAVE LOUIS BOURQUIN, a citizen of the Republic of Switzerland, and a resident of Merchantville, and RUDOLF LOEB, a citizen of the United States, and a resident of Camden, New Jersey, have invented certain Improvements in Embroidering-Machines, of which the following is a specification.

Our invention consists of certain improvements in embroidering machinery of the type illustrated and described in Letters Patent, No. 271,182, dated January 23, 1883, granted to Charles N. Wurth, of Camden, New Jersey.

The object of our invention is to improve the construction of the machine so that more perfect work can be produced and the mechanism will be more under the control of the operator, as fully described hereinafter.

Figure 8:
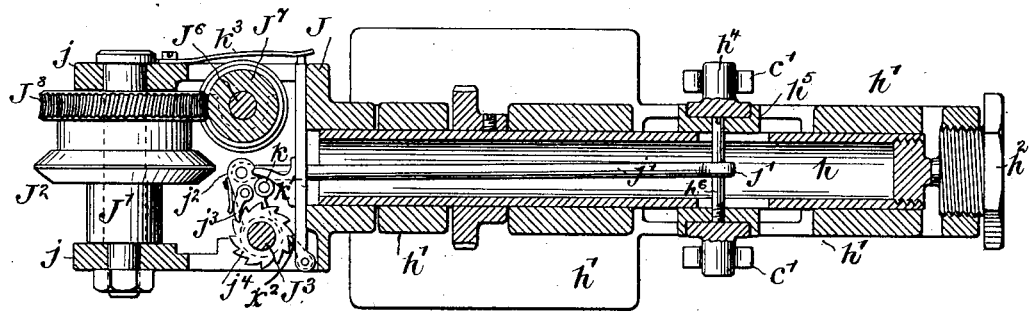
Figure 9:
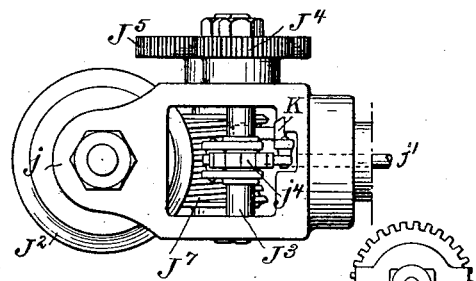
Figure 10:
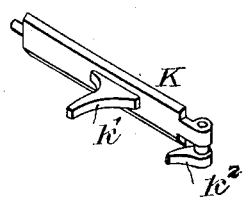
Figure 11:
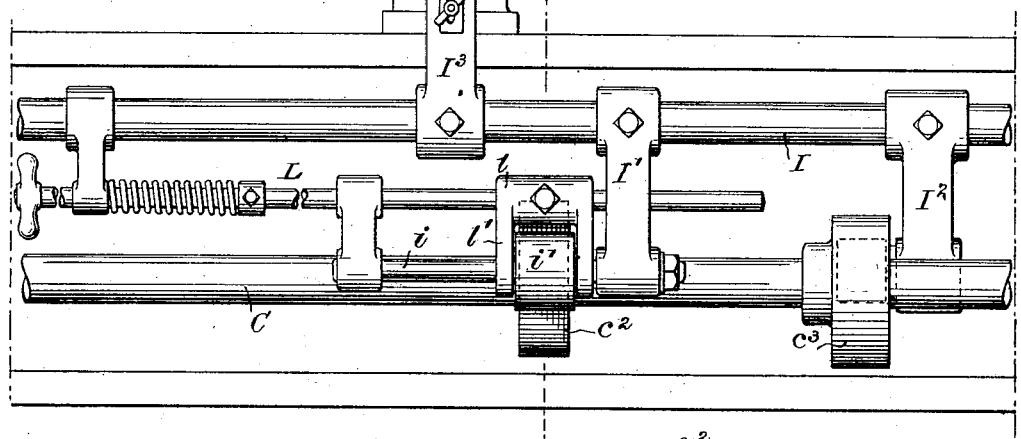
Figure 12:
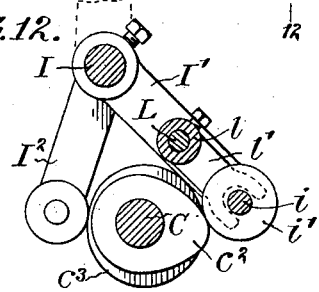
Figure 13:
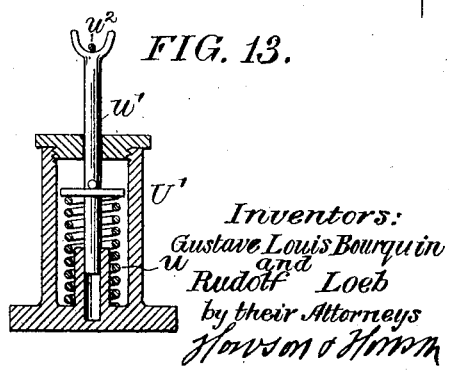
Figure 18:
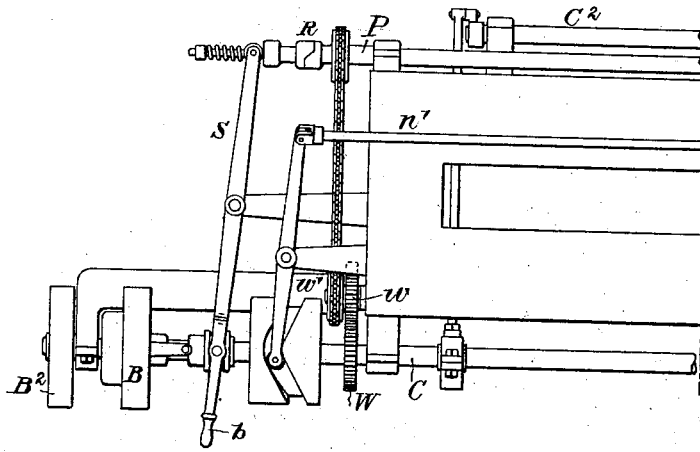
Figure 19:
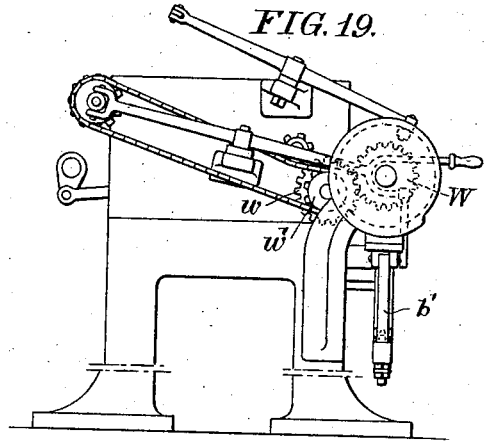
Figure 20:
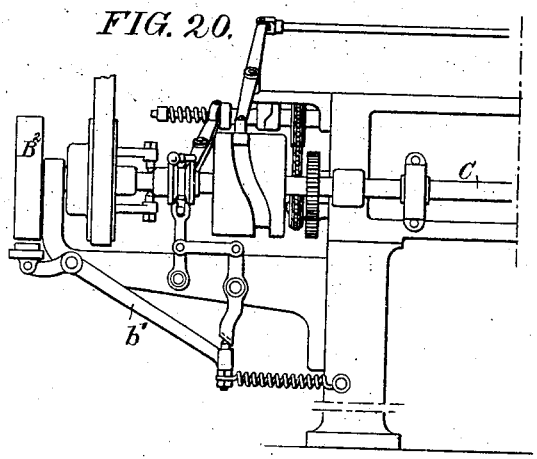
Figure 16:
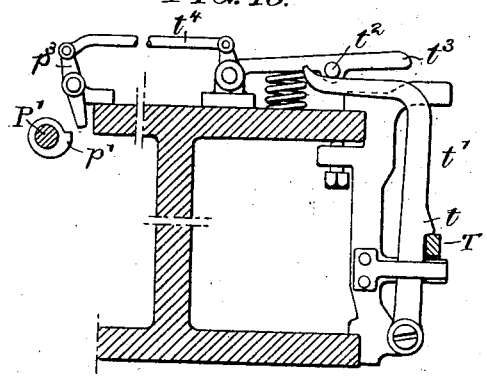
Figure 17:
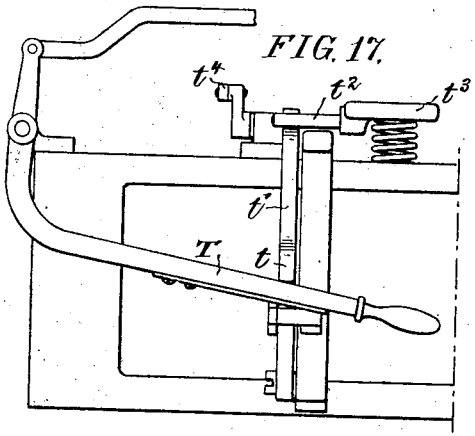

In the accompanying drawings, Figure 1 is a front view of our improved embroidering-machine. Fig. 2 is a plan view, partly in section. Fig. 3 is an end view. Fig. 4 is a transverse section on the line 4 4, Fig. 2. Fig. 5 is a transverse section on the line 5 5, Fig. 2. Fig. 6 is a rear view of the machine. Fig. 7 is an enlarged perspective view of the clutch. Fig. 8 is a horizontal section through one of the pantographs. Fig. 9 is a side view of the head of the pantograph. Fig. 10 is a detached perspective view of the slide-carrying pawl. Fig. 11 is a partial side view of the machine, showing the device for throwing the needles out of action. Fig. 12 is a section on the line 12 12, Fig. 11. Fig. 13 is a sectional view of one of the thread-supports. Fig. 14 is a cross-section of the frame, showing how the fabric is secured thereto. Fig. 15 is a perspective view of the instrument used for removing the fabric from the frame. Fig. 16 is a section on the line 16 16, Fig. 2. Fig. 17 is a side view of Fig. 16. Fig. 18 is a plan view of a modified form of the machine. Fig. 19 is an end view of the same, and Fig. 20 is a front view of the same.

Referring to Fig. 1, the fabric G to be embroidered is stretched in a frame G' upon pins or tenter-hooks, and the bar $g$ and screws $g'$ are employed to properly stretch the said fabric. A pattern-board F is secured to the frame G', and to this board is attached the pattern to be followed in embroidering the fabric. Pantograph-plates E and E' are secured at either end of the frame G', upon which the wheels of the pantographs, hereinafter described, act to move the plates and frame in any desired direction as the embroidering progresses, the line of the pattern being moved across the index-point D on the main frame A of the machine by the operation of the devices which control the wheels, as hereinafter explained. In order to allow of this movement of the frame G' and its fabric, it is necessary that the former should be hung so that it will require a very slight effort to move it up or down or to the right or left or diagonally, the movement being always in the same plane. To provide for this motion, I make use of a shaft $G^2$, having pulleys $G^3$. The said shaft has its bearings on standards A' of the machine. To counterbalance the weight of the frame G', weights are secured to bands $G^4$, which pass over the pulleys $G^3$. By thus having both ends of the frame counterbalanced the necessity of providing brace-rods to strengthen the shaft $G^2$, as heretofore where the counterbalance was at one end only, is done away with. Secured to the bands $G^4$ are flanged wheels $G^5$, upon which tracks $G^6$ are supported. These tracks are secured to the frame G' by screw-rods $g^2$.

We will now describe the actuating mechanism and the pantograph and embroidering devices.

The power is applied by a belt to a pulley B, and there is a friction clutch or coupling B' between the said pulley and the main driving-shaft C, so that the shaft can be stopped by operating lever $b$ or by an automatic stop-motion, as described hereinafter. Keyed to shaft C is a brake-wheel $B^2$, having an enlargement upon its periphery. $b'$ is a lever pivoted at $b^2$ to a bracket secured to the machine. The short arm of the lever is provided with a brake-shoe $b^3$, while the long arm of the lever passes under an arm $b^4$ of the lever $b$, so that when the lever $b$ is moved in one direction it forces the brake-shoe against the brake-wheel $B^2$ and holds it rigid while the enlargement on the surface of the brake-wheel jams against the brake-shoe, thus stopping the machine within one revolution of the shaft C. The lever $b$ is automatically operated by the clutch-operating mechanism, which is connected to the lever by an arm $b^5$ and connecting-rod $b^6$. The arm $b^5$ engages with the end of the lever which operates the clutch B', more fully described hereinafter. Upon the shaft C is mounted a beveled gear-wheel which meshes with a gear-wheel upon a counter-shaft C', (shown in Fig. 2,) which in turn is geared to a shaft $C^2$ at the back of the machine and running parallel with the shaft C. Mounted on the shafts C and $C^2$ are eccentrics $c$ $c$. (More clearly shown in Fig. 4.) Through these eccentrics $c$ $c$ motion is imparted to the pantographs H and H', situated one on each side of the pantograph-plate E at one end of the machine, and also the pantographs $H^2$ and $H^3$ at the opposite end of the machine. Thus it will be seen that the four pantographs act upon the plates E and E' simultaneously and are driven in unison.

The details of the pantograph are more clearly shown in Figs. 4, 8, and 9. Referring to Fig. 8, which is a horizontal section, $h$ is a hollow shaft mounted loosely in the casting $h'$. A center screw $h^2$ is provided to resist the end pressure upon the shaft. Secured to shaft $h$ is the head J, having bearings $j$, in which is journaled the shaft J', carrying the pantograph-wheel $J^2$. The wheels $J^2$ of the pantographs bear directly against the plate E and act in unison, the pressure being exerted by the spring $h^3$ of the pantograph H'. (See Fig. 4.)

Motion is imparted to the wheel $J^2$ as follows: In the present construction of the machine it is desired to have all the pantographs receive motion, thus equalizing the pressure upon the plates E and E'. To give this desired rotary motion to each of the several wheels $J^2$, a bell-crank lever $c'$ is pivoted to a bearing $c^2$ on the frame of the machine. (See Fig. 4.) Said lever is connected at one end to the eccentric-strap adapted to the eccentric $c$ on the driving-shaft, while the other end is bifurcated and engages with studs $h^4$, projecting from a collar $h^5$. (More clearly shown in Fig. 8.) This collar turns loosely upon a sleeve $h^5$, which slides upon the shaft $h$, said shaft being provided with slots to permit the pin $h^6$ passing through it. The pin $h^6$ carries a rod $j'$ connected to a lever $j^2$, on which is pivoted a pawl $j^3$, engaging with a ratchet-wheel $j^4$ on the shaft $J^3$. A roller $k$ is also mounted on lever $j^2$, which on its return motion acts upon the cam $k'$ on the slide K. (Shown more clearly in Fig. 10.) Pivoted to the end of this slide is another pawl, $k^2$, which acts upon the ratchet-wheel $j^4$. A spring $k^3$, secured to the jaw $j$, tends to return the slide K to its normal position when out of engagement with roller $k$. A gear-wheel $J^4$ is secured on the shaft $J^3$ and meshes with a gear-wheel $J^5$ on the shaft $J^6$, on which is a worm $J^7$, which meshes with a worm-wheel $J^8$ on the shaft J', said worm-wheel being secured to the wheel $J^2$. Thus it will be seen that an intermittent motion is imparted to the wheel $J^2$, moving the frame which carries the fabric.

The cams for driving the pantographs are so timed that the fabric will move only when the needles are withdrawn.

It is desirable when making extra fine work to reduce the speed of the movement. This result may be attained by removing the slide K, the effect of which is to give the ratchet-wheel $j^4$ a single movement instead of the double movement which is obtained when the slide K is in action. The removal of the slide K, carrying the auxiliary pawl $k^2$, may be accomplished by releasing the connecting-rod $j''$ from its retaining-pin $h^6$, so that the arm $j^2$ may be pushed out of the way to permit the passage of the cam $k'$ on the slide K past the roller $k$ and ratchet-wheel $j^4$. After this has been done the connecting-rod may be returned to its normal position and held by the pin $h^6$, when the desired single movement of the ratchet-wheel $j^4$ may be secured. The shaft C has also mounted upon it cams $c^2$ and $c^3$, which give motion, through arms I' and $I^2$, to the rock-shaft I, on which are mounted arms $I^3$, giving motion to the needles, a description of which is clearly given in the patent above referred to.

In the present machine there is provided a device for throwing the needles out of action. This is more clearly shown in Figs. 11 and 12. In the end of the arm I' is secured a small shaft $i$, on which a roller $i'$ is loosely mounted, which is acted upon by the cam $c^2$ on the shaft C. A shifting-rod L, mounted in brackets, extends to a point within the reach of the operator. A bracket $l$ is bolted to the shifting-rod and is provided with arms $l'$, extending on both sides of the roller $i'$. Thus, it will be seen, by moving the rod L longitudinally the roller $i'$ will be moved out of the path of the cam $c^2$, allowing the arm I' to fall, thus withdrawing the arm $I^3$, which controls the needles.

The pantographs, needles, and loopers are controlled in a manner similar to that described in the former patent alluded to above, except provision is made for controlling all the pantographs in the present instance.

The shaft M is governed by the handle $m$ on the shaft carrying the index-point D and is provided with gears operating the pantographs H and $H^2$ and also the needles. Said shaft imparts motion, through the train of gearing, to the shaft M', on which is mounted a gear-wheel $m^2$, giving motion, through an intermediate gear-wheel $m^3$, to a shaft $m^2$, on which is mounted a gear-wheel which controls the pantograph $H^3$. This shaft is also provided with a gear-wheel $m^4$, giving motion, through an intermediate gear-wheel $m^5$, to the shaft $M^3$, which controls the loopers and imparts motion, through the intermediate gear-wheel $m^6$, to the shaft $M^4$, having a gear-wheel which controls the pantograph $H'$.

The shaft $M^3$ has an end motion for operating the loopers, fully described in the patent alluded to. The means of obtaining this end motion, however, in the present instance is as follows: On the shaft $C'$ at the end of the machine is an eccentric N, (see Fig. 6,) which gives motion to the rod $N'$ through the medium of the eccentric-rod, bell-crank lever $n$, and connecting-rod $n'$. The rod $N'$ is provided with an arm $N^2$, engaging with a sleeve on the shaft $M^3$, thus imparting to it the desired end motion. The driving-gears in the present instance are secured to the shaft $M^3$ and move with it, they being made wide enough to allow for the movement of the shaft without being thrown out of engagement with the intermediate gears $m^5$ and $m^6$.

We provide a stop-motion which is actuated when any one of the threads breaks, so that the machine will be immediately stopped. At the rear of the machine back of each looper is a stop-lever $P^2$, through which the thread is guided. This lever has an arm $p^2$.

Extending along the rear of the machine is a shaft P, which is driven by a shaft $C^2$ through a train of gears $p$. On the shaft P are sleeves $p'$, having lugs. These sleeves are arranged under each stop-motion lever $P^2$ and are so arranged in respect thereto that when any one of the threads breaks the arm $p^2$ of that particular stop-motion lever will drop into the path of a revolving lug and will immediately stop the rotation of the shaft P. Mounted loosely on the shaft P is a clutch-head R, and secured to this clutch-head is a gear-wheel $r$, Fig. 7, which is one of the train of gears $p$ mentioned above. The opposite clutch-head $R'$ is splined to the shaft P so that it will turn with it but is free to slide thereon. The two abutting faces of the clutch-heads R and $R'$ have two bevel-teeth $r'$ in the present instance, and on the clutch-head R is a flange $r^2$, extending around a portion of the head, and this flange prevents the clutch-head $R'$ from engaging the clutch-head R until a complete revolution of the shaft has been made. Thus we are enabled to equalize the strain on the shaft by having the two clutch-teeth. This clutch is provided for the purpose of stopping the machine should any one of the embroidering-threads break. Upon the breaking of any one of the embroidering-threads and the consequent stoppage of the shaft P the continued rotation of the clutch-head R, which is mounted loosely on the shaft P through the medium of a train of gears, will cause the clutch-head $R'$ to back away from the head R and will come in contact with one arm of the lever S, the other arm of this lever engaging the sleeve of the clutch $B'$, before described, releasing the clutch and stopping the main driving-shaft.

Referring to Figs. 16 and 17, there is shown a locking device which is provided to prevent the lever T from being moved. Said lever operates the thread-cutters and if moved while the machine is running will result in the breaking of the needles. The lever T is prevented from being raised by a projection $t$ on the latch-lever $t'$, the upper end of which extends under a pin $t^2$, projecting from a hand-plate $t^3$, which must be pressed down before the latch can be opened, thereby withdrawing the rod $t^4$, which moves the stop $p^3$, so that it will engage with the lug $p'$ on the stop-shaft P, thus causing the machine to be stopped before the lever T can be raised.

In Fig. 5 a tension device U is shown for keeping the thread taut. This is more clearly shown in Fig. 13. It consists of a casing $U'$, in which is a spring $u'$ acting on a rod, said rod having a forked upper end through which the threads $u^2$ travel.

Fig. 14 is a cross-section of the frame on which is attached the fabric. It consists of an angle-iron $q^3$, to which a plate $q^4$ is riveted, and to this plate are secured the pins or tenter-hooks, over which the fabric is placed. The plate $q^4$ is bent so that the points of the pins will be level with the surface of the main portion of the plate, so that when the fabric is being placed on the frame the operator may place the edge of it over the hooks or pins by rapidly passing his fingers over the plate $q^4$ without the necessity of his fingers coming in contact with the points of the hooks.

In Fig. 15 there is shown a device for removing the fabric from the hooks. This consists of a strip of wood V, having a rounded portion $v$, which is used as a handle. A plate $v'$ is secured to one side of the strip V. This is pressed between the fabric and the plate $q^4$, thereby removing the fabric from the pins.

A modified form of the driving mechanism is shown in Figs. 18, 19, and 20. In this form we use a sprocket-chain to drive the stop-shaft P, said chain being driven by a gear W on the driving-shaft C, which meshes with an intermediate gear $w$, secured to the sprocket-wheel $w'$, over which the chain passes. This device can readily be used with my improved brake mechanism and the clutch which allows a complete revolution before it falls back in engagement, which is sufficient time to stop the machine, and thus avoid breaking the chain.

It will be seen by the above description that we are enabled to drive the four pantograph mechanisms in unison, thus insuring proper movement of the frame carrying the material to be embroidered, and by this arrangement we can construct a much larger machine than heretofore.

Although we have shown and described in the present application special mechanism for effecting the stoppage of the machine, which mechanism may be operated manually or automatically by the breaking of any one of the threads, such mechanism is not claimed herein, but forms the subject of a divisional application for patent, filed May 3, 1904, Serial No. 206,235.

We provide mechanism by which the stop-motion acts immediately upon the breaking of a thread and in which the thread-cutters cannot be operated without the machine is first stopped.

We claim as our invention—

1. The combination in an embroidering-machine, of a pantograph-plate, a carrier, a pantograph-wheel mounted thereon, a ratchet-wheel, a shaft carrying said ratchet-wheel, worm-gearing between the ratchet-wheel shaft and the pantograph-wheel, a driven eccentric, a connecting-rod, a lever, and a pawl engaging with the ratchet-wheel and operated through the medium of the lever, substantially as described.

2. The combination in an embroidering-machine, of the needle mechanism and looper mechanism, a carrying-frame for the material, pantograph-plates on each end of the said frame, pantograph-carriers mounted at opposite sides of each plate and having pantograph-wheels bearing against the plates, means for operating the pantographs in unison, a shaft for controlling the position of the pantograph-wheels, said shaft gearing with the two front pantograph mechanisms and with the needle mechanism, a rear shaft gearing with the loopers and short shafts gearing with the two rear pantograph-carriers and with the looper-shaft and intervening gearing between the main shaft and one of the rear pantograph-shafts, substantially as described.

3. The combination in an embroidering-machine, of the thread-cutting device, a lever for operating the same, a locking device for said lever, said locking device consisting of a bracket on which is pivoted a latch adapted to engage said operating-lever, a rock-shaft, a plate pivoted to said rock-shaft, a pin carried by said plate and adapted to act upon the pivoted latch, a stop-shaft, a lug thereon, and a connecting-rod, said connecting-rod being attached to an arm carried by the rock-shaft and serving to operate an arm which engages with the lug of the stop-shaft, substantially as described.

4. The combination in an embroidering-machine, of the needles, a rock-shaft for operating the same, a main driving-shaft and a device for throwing said rock-shaft out of engagement with the main driving-shaft, consisting of an arm mounted on the rock-shaft, a shaft on which slides a roller, a cam on the main driving-shaft, a hand-rod for withdrawing the roller from engagement with said cam, arms for supporting said rod, and a spring adapted to hold it in its normal position, substantially as described.

5. The combination with an embroidering-machine of the character described, of a tension device for the embroidering-threads, said tension device comprising a sliding rod forked at one end to receive the thread, an inclosing casing for said rod providing a vertical guide for the same, a washer carried by the rod, and a spring interposed between said washer and the base of the casing, substantially as described.

6. The combination in an embroidering-machine, of the pantograph-head, a feed-wheel mounted therein, ratchet mechanism for operating said feed-wheel, means for moving said ratchet mechanism, and a removable auxiliary pawl combined with said ratchet mechanism, substantially as and for the purpose specified.

7. The combination in an embroidering-machine, of a pantograph-head, a feed-wheel mounted therein, a ratchet-wheel carried by said feed-wheel, a lever, a pawl on said lever engaging said ratchet-wheel, means for operating said lever, and a slide mounted in the head and having a pawl also engaging said ratchet-wheel, substantially as described.

8. The combination in an embroidering-machine, of the loopers, a shaft geared to said loopers, means for moving the shaft longitudinally, wide-faced gear-wheels on said shaft, pantograph-heads, gearing thereon, and a wide-faced intermediate gear meshing with the wide-faced gear of the looper-shaft, substantially as described.

9. The combination in an embroidering-machine, of the loopers, a shaft geared thereto, pantograph-heads geared to the looper-shaft, a driven shaft, an eccentric thereon, a strap, a bell-crank lever connected to the eccentric-strap, a sliding bar connected to the lever and having an arm engaging the looper-shaft, substantially as described.

In testimony whereof we have signed our names to this specification in the presence of two subscribing witnesses.

GUSTAVE LOUIS BOURQUIN.
RUDOLF LOEB.

Witnesses:
 WILL. A. BARR,
 JOS H. KLEIN.